United States Patent
Cauduro (10) Patent No.: US 6,609,750 B1
(45) Date of Patent: Aug. 26, 2003

(54) VEHICLE HATCH

(76) Inventor: Armando Cauduro, Fuente de Etiopia No. 29, Col. Lomas de Tecamachalco (MX)

(*) Notice: Subject to any disclaimer, the term of this patent is extended or adjusted under 35 U.S.C. 154(b) by 0 days.

(21) Appl. No.: 09/646,377

(22) PCT Filed: Jul. 27, 1999

(86) PCT No.: PCT/IB99/01327

§ 371 (c)(1),
(2), (4) Date: Feb. 9, 2001

(87) PCT Pub. No.: WO00/06405

PCT Pub. Date: Feb. 10, 2000

(30) Foreign Application Priority Data

Jul. 30, 1998 (MX) ............................................ 986131

(51) Int. Cl.[7] .................................................. B60J 7/08

(52) U.S. Cl. .................... 296/216.02; 296/224; 49/193; 49/402; 49/505

(58) Field of Search ........................... 296/216.02, 224; 49/193, 402, 505

(56) References Cited

U.S. PATENT DOCUMENTS

| | | | |
|---|---|---|---|
| 4,433,506 A | | 2/1984 | Manning |
| 4,495,731 A | * | 1/1985 | Sears |
| 4,519,645 A | * | 5/1985 | Kelly et al. .................. 296/224 |
| 4,964,673 A | * | 10/1990 | Lamparter ............. 296/216.02 |

* cited by examiner

Primary Examiner—Joseph D. Pape
(74) Attorney, Agent, or Firm—Knobbe, Martens, Olson & Bear, LLP (57) ABSTRACT

The present vehicle hatch for passenger vehicles comprises a hatch cover, sealant member and mounting frame assembly. The mounting frame assembly allows for the hatch cover to open to angle greater than 90 degrees. The hatch may be in any one of several positions including: totally closed, providing a hermetic seal pervious to dust and waterproof; open in all its periphery; open only at its front; open only at its front; open only at its rear; open on its right or left side; and open with the upper cover at an angle greater than 90 degrees, thereby serving as an emergency exit. The mounting frame and hatch cover provide an improved seal against penetration of water and other particles, and provide an improved aerodynamic feature. The mounting frame may be telescopically adjustable to provide for secure mounting on vehicle bodies of varying thicknesses.

9 Claims, 10 Drawing Sheets

VEHICLE HATCH

TECHNICAL FIELD

This invention relates generally to devices known as hatches, and more specifically to safety devices of the type used in multi-passenger public transportation vehicles to allow passenger escape in emergency situations. As an emergency exit, such hatches are typically located at the roof of such vehicles.

BACKGROUND

A wide variety of hatch designs have been employed to address concerns over the structure of hatches and the material used for hatches. These approaches have addressed certain operational requirements particularly the sealing of such hatches, so that when fitted on vehicle roofs, neither dust nor water is allowed entry into the vehicle, i.e. the hatches are hermetically sealed. Other objects of prior hatch designs include providing severs positions during operation so the hatches not only serve as emergency exits, but may also serve as ventilation devices to regulate the interior temperature of vehicles.

U.S. Pat. No. 4,021,073, issued to Manning, entitled "Combined Vent and Escape Hatch", discloses a hatch for a vehicle roof opening having hinge linkages that connect the hatch to the roof structure, allowing the hatch to tilt upwardly in one of two directions, or to elevate the hatch completely. Separable parts of the hinge linkage permit the hatch to be fully open for use of the roof opening as an escape hatch. In an alternate embodiment, the hatch is hinged for tilting in only one direction to a ventilating position or swinging to the fully open position in the same direction. U.S. Pat. No. 4,964,673, issued to Lamperter, entitled "Vehicle Hatch Mounting Assembly", discloses a combined' vent and escape hatch assembly for a vehicle roof wherein the hatch is supported upon a pair of over-center hinge linkage devices, one of which may be disconnected, enabling the hatch to be fully opened for emergency exit purposes. The other hinge device is protected against damage by hyper-extension through the flexure of various hatch supporting components.

Mexican Patent No. 156749 entitled "Improvements to a Combined Vent and Escape Hatch,", discloses an opening which vents the vehicle and an upwardly movable hinged cover'. A mechanism limits the upward movement of the cover to an inclined position. The mechanism consists of a connected lever with one end attached to the cover and the second end free to move upwardly toward the bottom of the cover. A bracket has two portions extending generally parallel to each other adjacent to an opening side, one of the portions being fixed at the cover. A joint is pivotally secured to the second bracket portion, which in turn is attached to the vehicle roof. Each of the bracket portions has an opening aligned with the opening in the other portion. The lever has a lug which fits with the opening in each bracket portion, allowing outward movement in response to the pivotal movement of the second end of the lever relative to the cover. The second end of the lever has a side lug that transmits ascending manual force to the cover to cause the bracket portions to separate after the lug separates from the portion openings. A handle extends through the cover and connects with the lever, so that the lever can be moved from either the interior or exterior of the vehicle roof.

Another reference which addresses sealing of the hatch is Mexican Patent No. 158,114, entitled "Improvements in an Assembly for Mounting a Vehicle Hatch". This patent discloses an assembly for mounting a vehicle hatch for passenger vehicles and the like. The assembly includes a high resistance plastic mounting ring having an integrated continuous sealing box. The mounting ring is centered in the hatch opening of the vehicle, and has an edge on the outside of the box at the same level as the hatch opening to form a sealing edge. The ring has an integral mounting flange extending laterally outward from the sealing box to overlay the external marginal edge of the vehicle opening where the hatch is mounted, and to mount the hatch with the sealing box. A continuous cavity at the exterior is a bevel receiver at the internal circumference of the sealing box which opens to the ring interior to receive an ornament bevel leg.

Applicant is the owner of Mexican Patent No. 186768 which discloses a vehicle hatch including assembly or cover, which includes an exterior cover and an interior cover with a rubber sealant tube located between both said covers around all its perimeter, a safety mechanism assembled in the upper portion of the interior cover which provides an oscillating movement; a second assembly, or exterior frame; a joining metal support secured to the exterior frame by a mechanical fastening; and an interior frame joined to the exterior frame.

The present invention discloses a new vehicle hatch which solves problems present in the prior art. The invention permits the hatch to be opened to a greater degree without additional stress to the hatch or vehicle, thereby functioning as an improved safety device. An improved hermetic seal prevents the penetration of water and dust into the vehicle when the hatch is installed and in a closed position. The hatch provides an aerodynamic structure in relation to the movement of the vehicle, by diverting the frontal wind collision against the hatch walls and diverting rainwater to prevent entrance of the rainwater into the vehicle.

SUMMARY OF THE INVENTION

A vehicle hatch assembly is provided where a two part mounting frame is located on an opening in a vehicle roof, where said frame supports a hatch cover by at least two hinge linkage devices. The mounting frame is comprised of an exterior frame and an interior frame, both frames surrounding the exterior and interior surfaces, respectively, of the vehicle roof. One of the hinge linkage devices is fixed and at least one is capable of separating, where the separation of the hinge linkage allows the hatch cover to be opened to an escape position. A cavity is formed at the exterior frame on the same side of the frame assembly as the fixed hinge linkage. Upon opening of the hatch to an escape position, the cavity in the exterior is capable of receiving an edge of the hatch cover, allowing the hatch cover to be opened to an angle greater than 90 degrees without imposing stress upon the hatch, the frame assembly, or the vehicle body.

The invention also provides a channel formed within the exterior frame, where the channel is capable of receiving a sealant that is attached to the hatch cover. When the hatch covered is closed, the channel compresses the sealant, thereby creating a secure seal against the penetration of water and dirt. The two walls of the channel are of different heights, where the interior wall, being the wall closest to the vehicle opening, is higher than the exterior wall. The higher interior wall further aids in preventing dust or water from penetrating into the vehicle interior.

The invention also provides for a sloped, aerodynamic surface on the exterior frame and a complementary sloped surface on the hatch cover. The sloped surfaces are located on the frame and cover in the direction of the vehicle movement, and in that respect, the fixed hinge is therefore located at the trailing side of the hatch.

DETAILED DESCRIPTION

Figure 1:
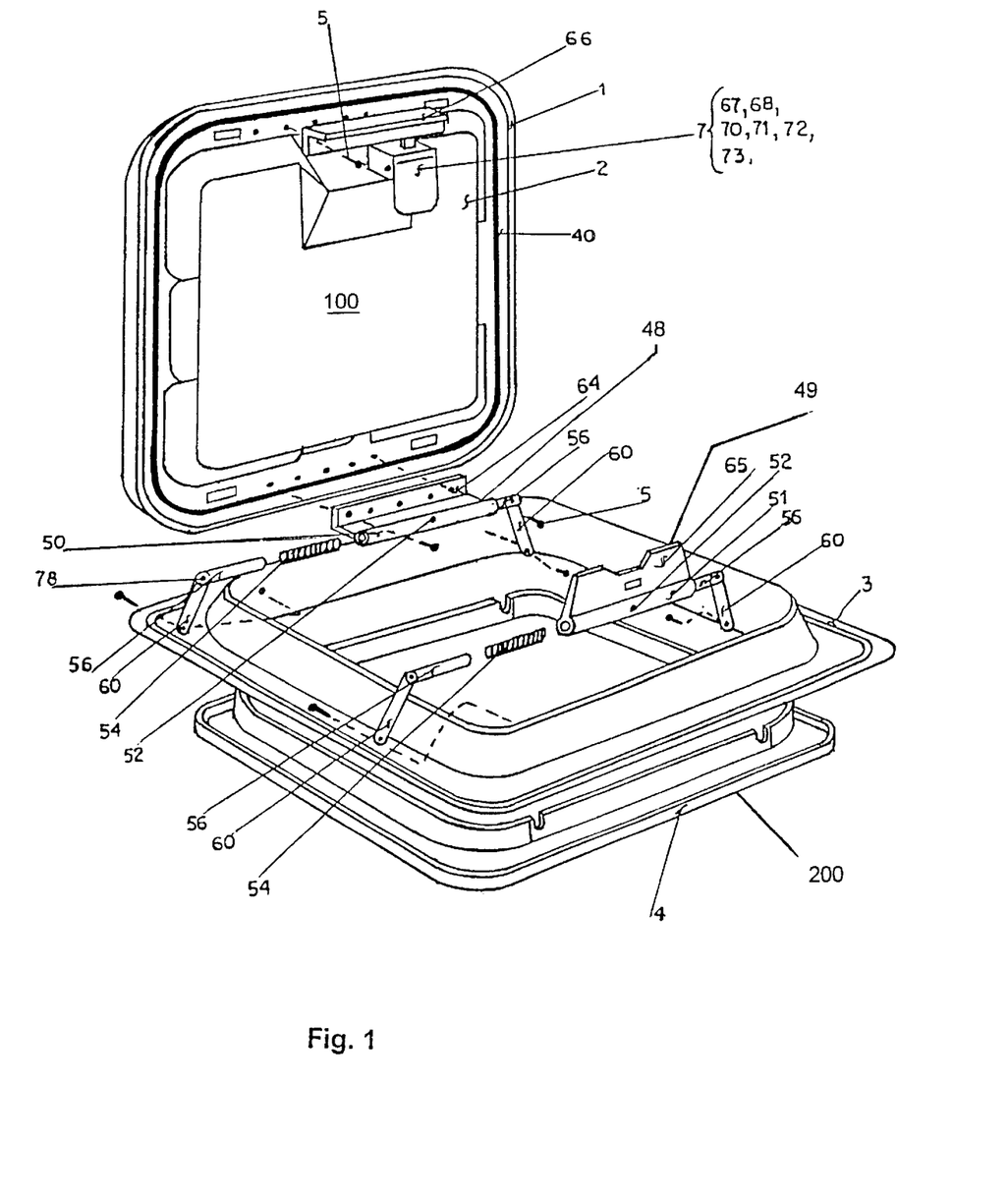
FIG. 1 is a front perspective and exploded view of the hatch, in its completely open position, thereby serving as emergency exit.

FIG. 1 shows hatch cover 100, which is comprised of exterior cover 1 and interior cover 2, where exterior cover 1 is shown to overlap interior cover 2. Sealing tube 40 is located around the entire perimeter of interior cover 2, and within the perimeter of exterior cover 1.

Mounting frame assembly 200 includes an exterior frame 3 and a "J" shaped interior frame 4. Hinge linkage assemblies 48 and 49 each include pivot supports 60, pivot pins 56, compression spring 54, hinge tube 50 and coil pin 52. FIG. 1 shows two hinge linkage assemblies in their preferable positions relative to the mounting frame assembly 200.

Figure 2:
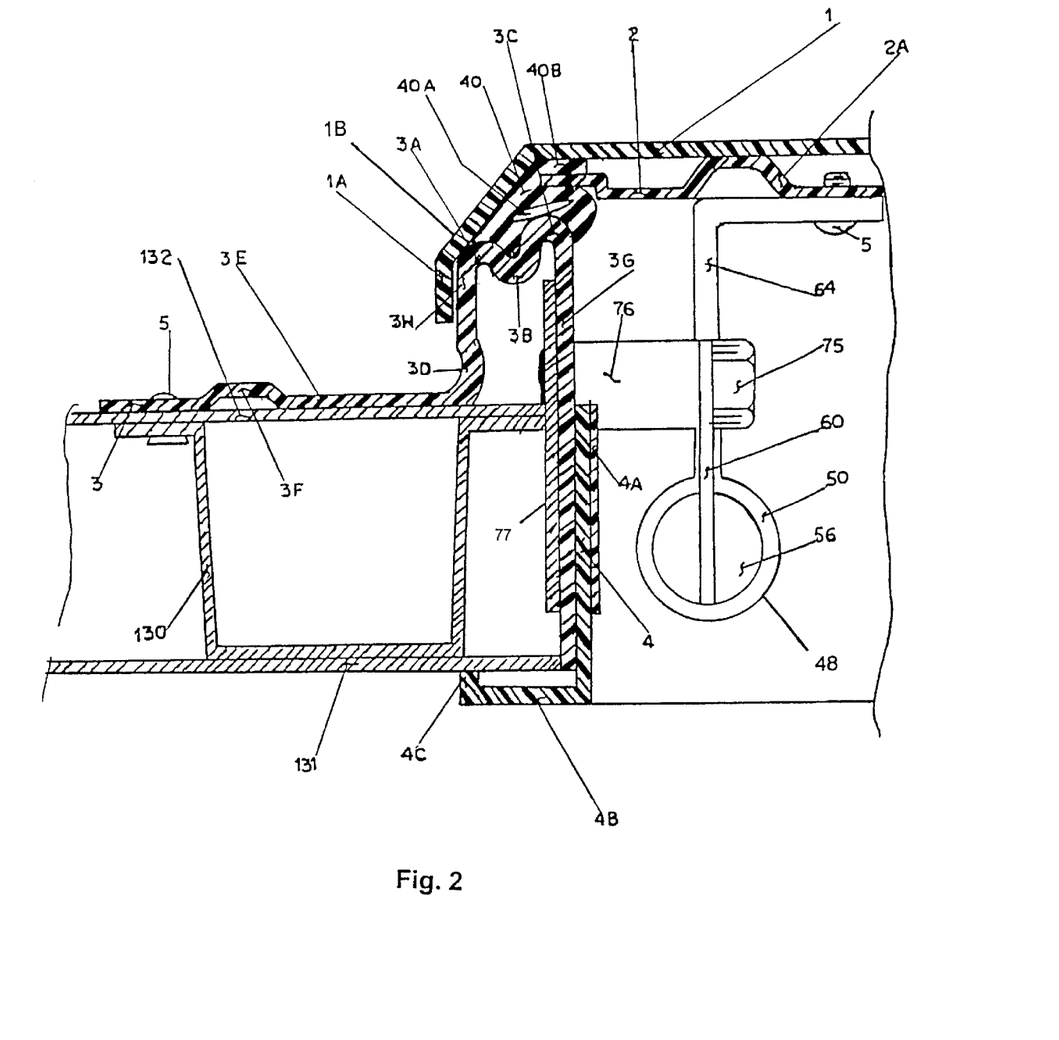
FIG. 2 is a side cross sectional view of the exterior cover, interior cover, exterior frame and interior frame assembly, at the rear section of the hatch, revealing the hinge-function mechanism of the emergency exit.
Figure 3:
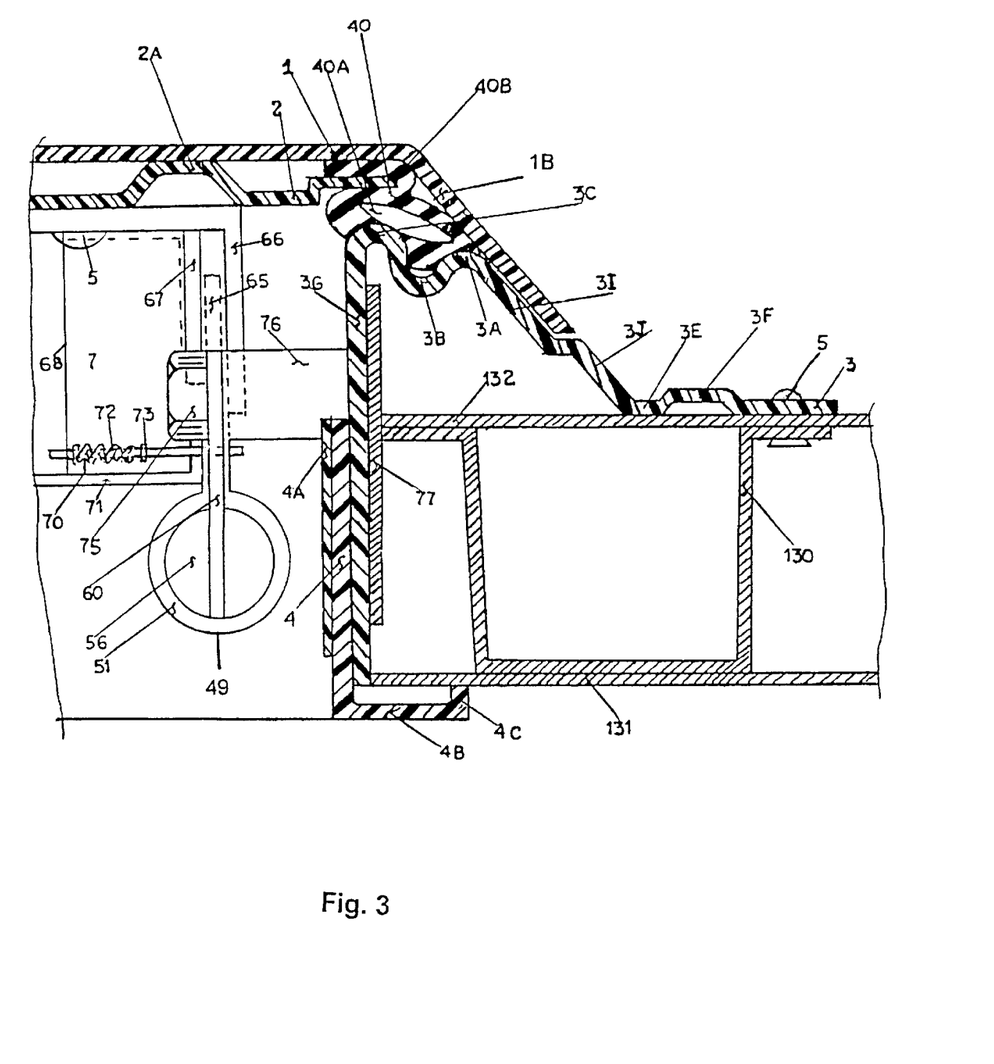
FIG. 3 is a side cross sectional view of the exterior cover, interior cover, exterior frame and interior frame assembly, at the front section of the hatch, showing the release mechanism of the emergency exit.
Figure 4:
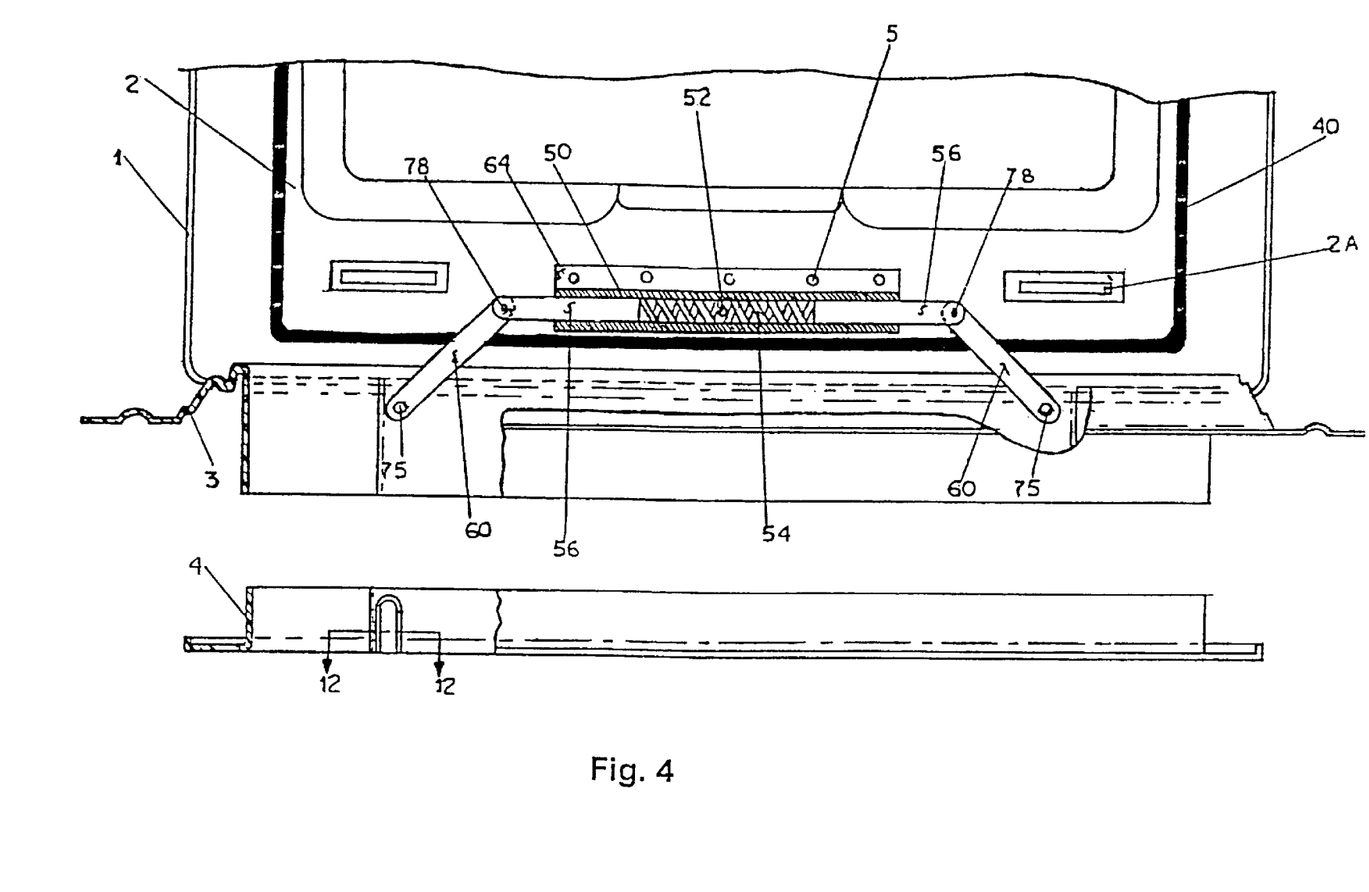
FIG. 4 is a front, partially cut out, cross sectional view of the hatch cover hinge linkage and mounting frame assembly at the rear section of the hatch, showing an exploded view of the mounting frame.
Figure 5:
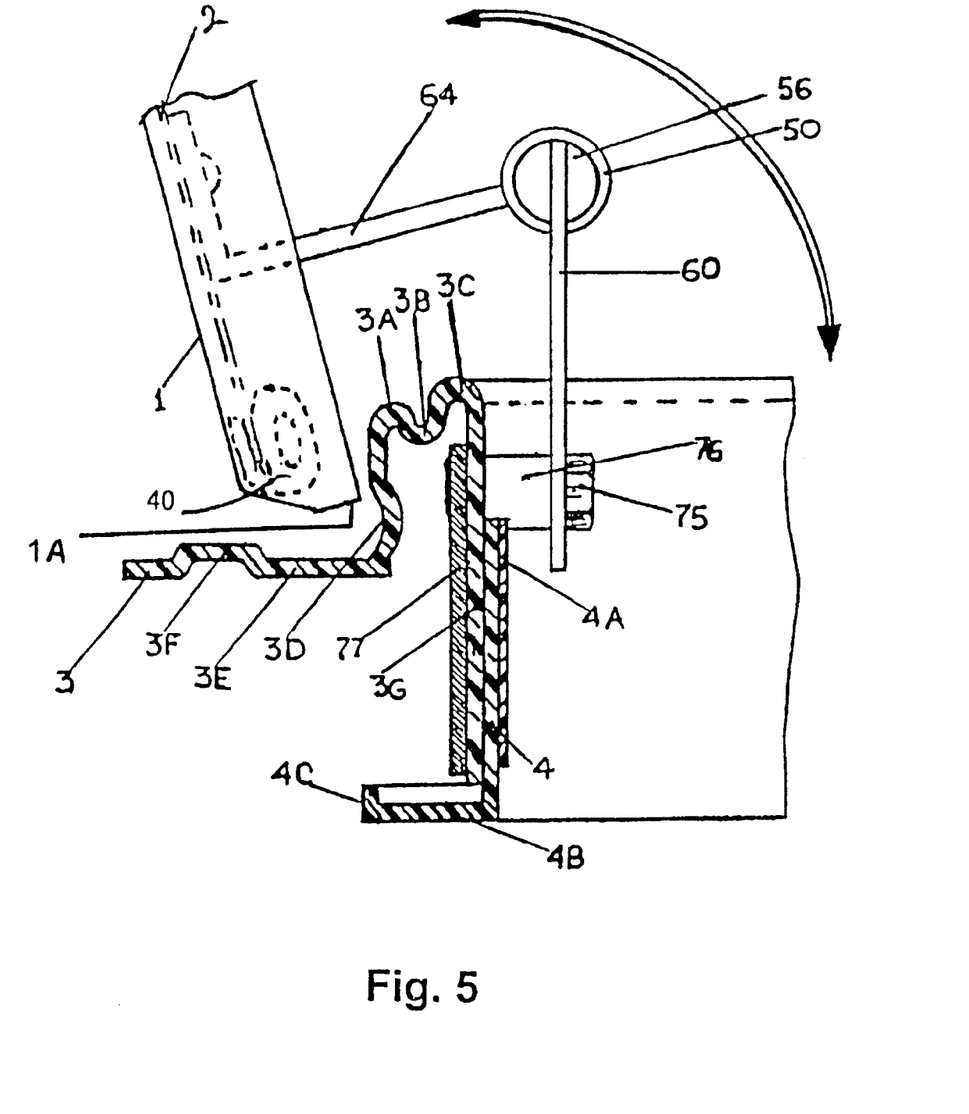
FIG. 5 is a side cross sectional view of the exterior cover, interior cover, exterior frame and interior frame at the rear section of the hatch, showing the hinge linkage normally opened.
Figure 8:
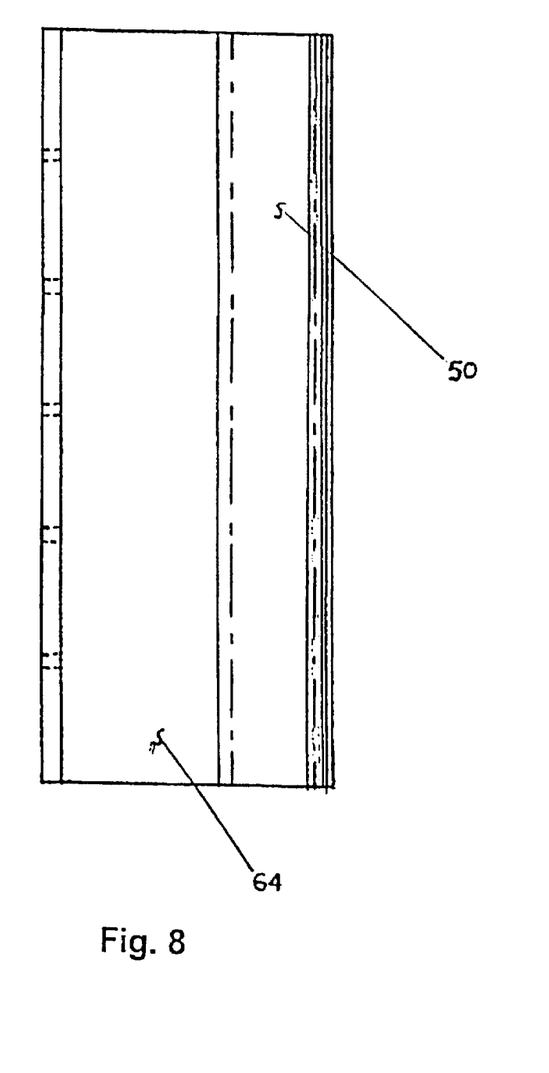
FIG. 8 shows a top view of the hinge tube and L-shaped angular member assembly.
Figure 9:
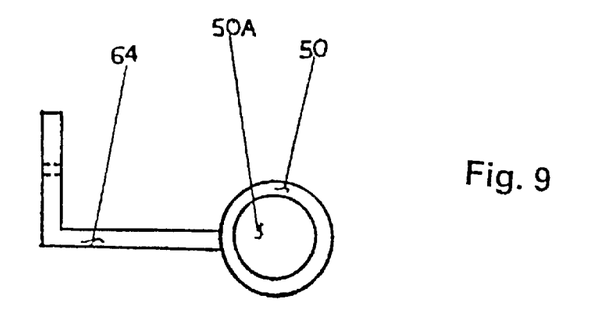
FIG. 9 shows a side view of the hinge tube and L-shaped angular member assembly of FIG. 8.
Figure 10:
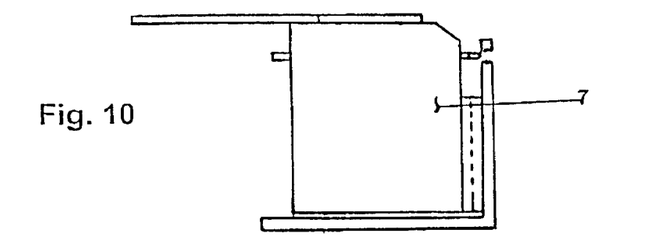
FIG. 10 is a side view of the release mechanism.
Figures 11, 12, 13:
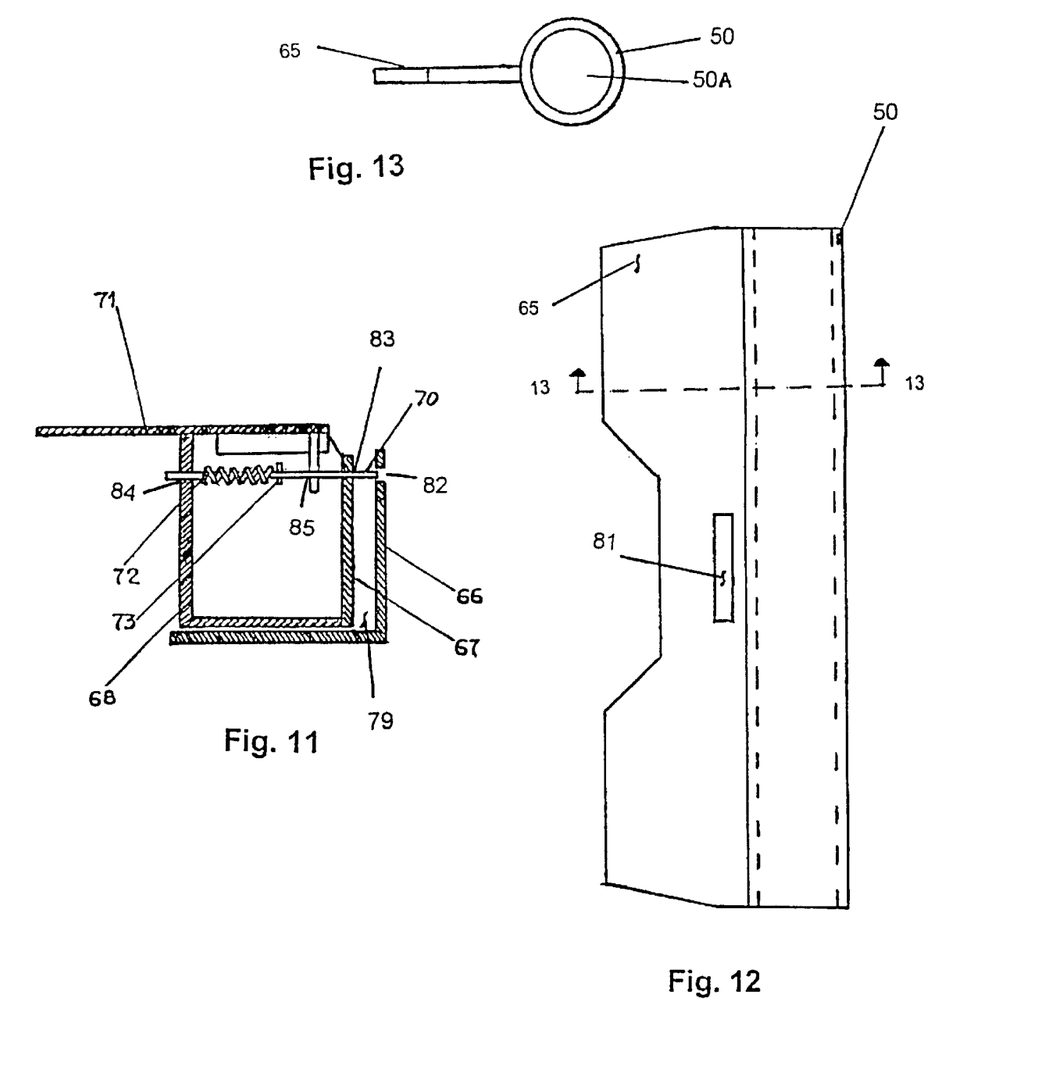
FIG. 11 is a side cross sectional view of the release mechanism.
FIG. 12 is a top view of the latch plate and hinge tube assembly.
FIG. 13 is a side cross sectional view of the latch plate and hinge tube assembly along the line 13—13 in FIG. 12.

Hatch cover 100 is fixedly attached to hinge linkage assembly 48 by L-shaped angular member 64, which assembly is shown in greater detail in FIGS. 2, 4 and 5. The attachment of L-shaped angular member 64 to hinge tube 50 is shown in FIGS. 8 and 9. A second hinge linkage assembly 49 provides for a separable attachment of the hatch cover 100 to the mounting frame assembly 200. FIGS. 1, 3, 6, 7, and 10–14 show varying details of the separable hinge and components thereof.

Figure 14:
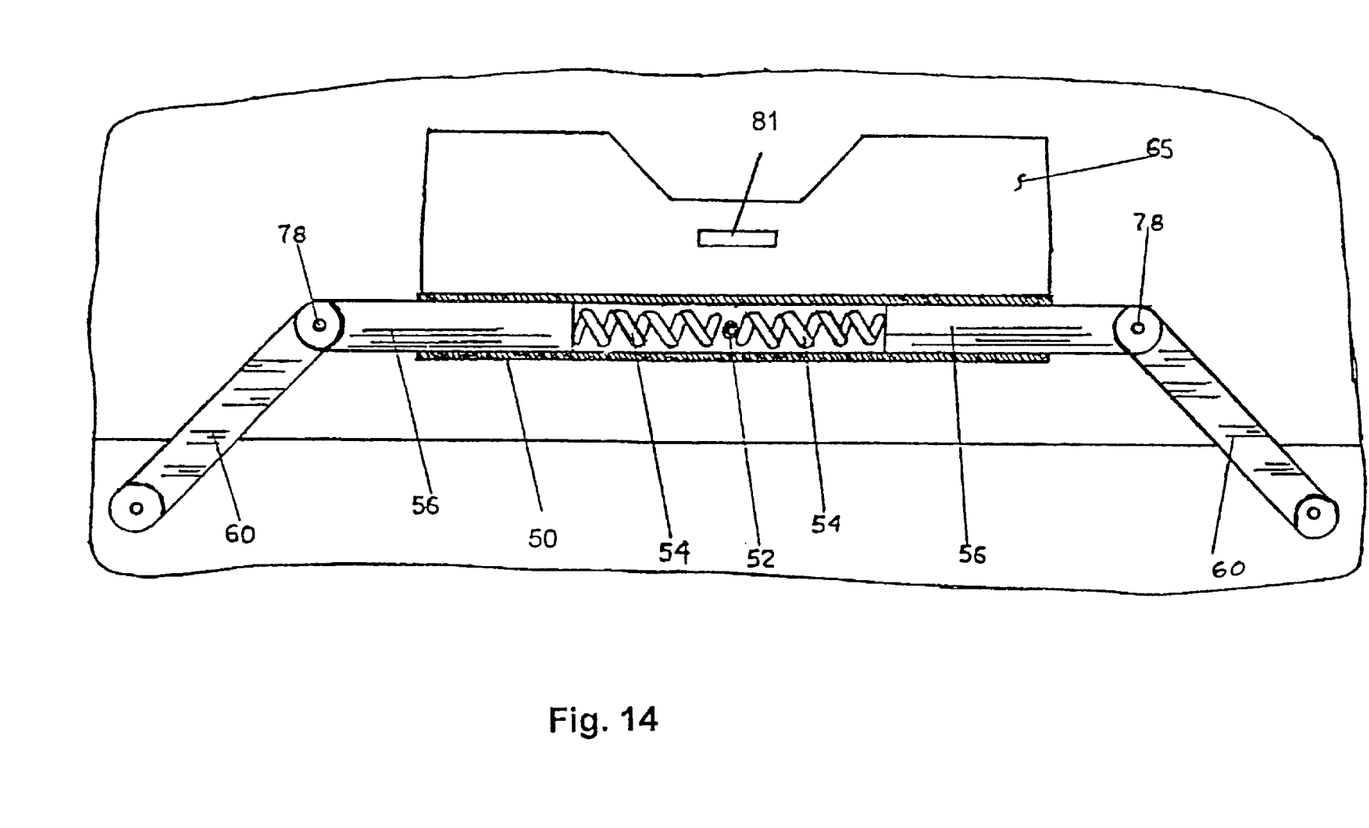
FIG. 14 is a front cross sectional view of the safety mechanism.

The hinge linkage assemblies 48 and 49 are generally of a design known in the art. As shown in FIGS. 1, 4, and 14, pivot supports 60 are attached at one end to the interior wall of exterior frame 3 and may rotate around the point of attachment. The opposite end of each pivot support 60 is moveably attached to one end of pivot pin 56. The opposite end of each pivot pin 56 is located within hinge tube 50, with compression spring 54 located between the two pivot pins 56 and within hinge tube 50. Compression spring 54 may be secured within hinge tube 50 for greater stability.

Various elements of the hatch cover and frame assembly may be secured together by any mechanical fixing means 5, such as screws, bolts, or other means known to the art.

FIGS. 2 and 3 show a primary aspect of the present invention, namely, the sealing system between the exterior, cover 1 and the exterior frame 3. Elements of exterior frame 3 are shown as lower edge 3A, channel 3B, upper edge 3C, cavity 3D, exterior wall 3E, cavity 3F, interior wall 3G, and non-tilted wall 3H. The combination of lower edge 3A, channel 3B, and upper edge 3C serves to provide for the deformation of sealing tube 40 during compression which deformation causes a hermetic seal preventing the penetration or filtration of water and dust within the vehicle when the hatch cover 100 is closed.

It is preferred for exterior frame 3 to be molded in a single piece, with lower edge 3A, channel 3B, and upper edge 3C, formed as one integral unit. The arrangement of the upper and lower edges, whereby the upper edge 3C is located on an interior wall of channel 3B toward the opening of the frame and lower edge 3A is located on an exterior wall of channel 3B distal from the opening of the frame, further serves to prevent the penetration or filtration of water and dust within the vehicle when the hatch is closed. Any water or dust which might pass lower edge 3A would also have to pass the sealing tube 40 within channel 3B and then travel against gravity toward upper edge 3C before it could enter the vehicle. The tiered relationship of the upper and lower edges provides an improved barrier to the penetration of water or dust into the vehicle.

Sealing tube 40 includes a cavity 40A, which upon closure of the hatch, is deformed during compression, causing a hermetic seal. Sealing tube 40 includes an integral flap 40B which is secured between the exterior, cover 1 and interior cover 2. Rubber is a preferred material for sealing tube 40, but any pliable material can be used.

Unlike prior hatch covers, the present invention combines the feature of a wider opening with an effective sealant.

Exterior frame 3 is provided with a cavity 3D allowing the entrance of edge 1A of the exterior cover 1, thereby allowing hatch cover 100 to open relative to the exterior frame 3 at an angle greater than 90 degrees. Exterior frame 3 is also provided with a pre-molded cavity 3F for including a type of sealant to avoid the filtration of water and dust to the interior structure of vehicle 130 which is delimited by interior wall 131 and exterior wall 132 forming the vehicle roof frame.

Figure 15:
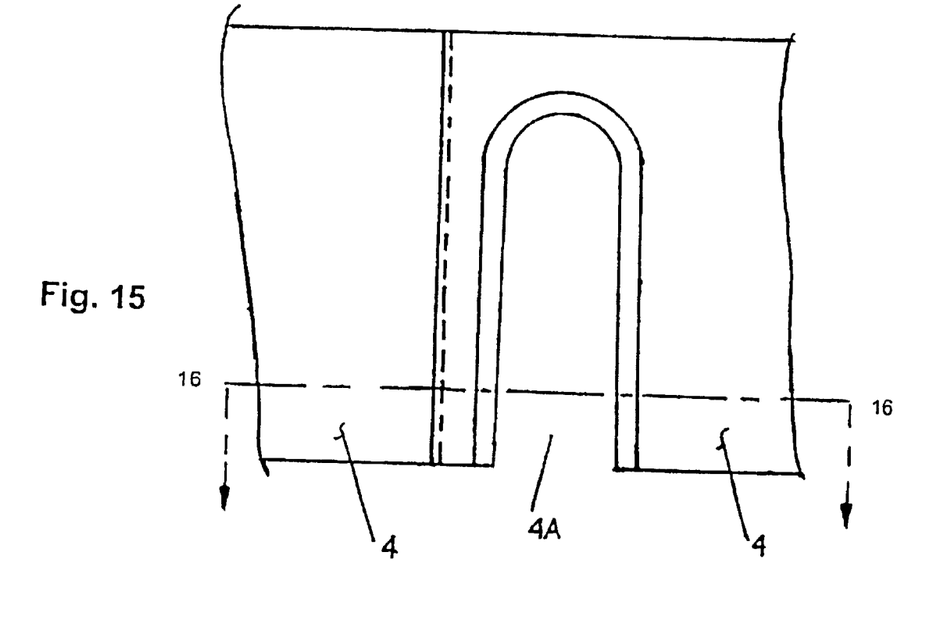
FIG. 15 is a cross sectional view of the bayonet formed interior frame to provide for a joining bushing of the hatch.
Figure 16:
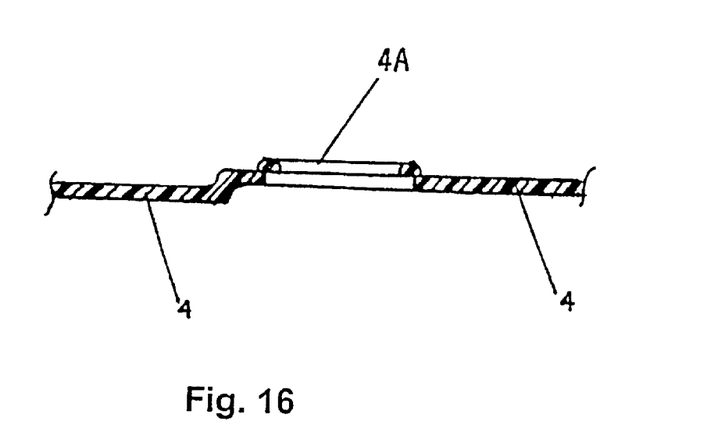
FIG. 16 is a cross sectional view of the interior frame along the line 16—16 in FIG. 15.

The interior frame 4 is J-shaped to aid in securing the mounting frame assembly 200 to the vehicle. As shown in FIGS. 15 and 16, interior frame 4 includes four cavities 4A, which allow for variable telescopic assembly with the exterior frame 3. This variable telescopic assembly provides, the present hatch cover with the ability to be installed on a variety of vehicles, with differing vehicle roof thicknesses, without requiring custom manufacture for each vehicle.

Interior frame 4 is attached to exterior frame 3 around vehicle exterior wall 132 and vehicle interior wall 131 in a clamp-like manner. Joining support 77 is provided adjacent to interior wall 3G and interior frame 4 to strengthen the attachment of the frame. Joining bushing 76 is fixedly attached to exterior frame 3 at interior wall 3G and is also attached to joining support 77. Cavities 4A allow for joining bushing 76 to be in varying position relative to interior frame 4. Therefore cavities 4A allow for the mounting frame assembly to be installed in roofs with different thicknesses.

Hinge linkage assemblies 48 and 49, as secured to hatch cover 100 allow hatch cover 100 to be in the following positions: totally closed providing a hermetic seal pervious to dust and waterproof; open in all its periphery; open only at its front, open only at its rear; open on its right side; open on its left side; and open with the hatch cover at an angle greater than 90 degrees, thereby serving as an emergency exit. Tilted wall 3I–3J provides an aerodynamic feature to the exterior frame, specifically to those sides of the frame subject to wind force and resistance in the direction of vehicle travel, namely the front and right and left sides. In one embodiment, the tilted wall is tilted at an angle of between 100 and 170 degrees relative to the horizontal axis of the assembly. The rear side has vertical wall 3H and cavity 3D instead of tilted wall 3I–3J.

As seen in FIGS. 2 and 3, the coupling of exterior cover 1 and interior cover 2 is obtained by complementary design of both covers, wherein in one of two sides of the hatch the exterior cover 1 has a horizontal flat surface which extends to its perimeter or periphery by a titled wall 1B, which continues as a vertical wall 1A in the rear. The edge of wall 1A, as herein stated is the one entering in cavity 3D of the exterior frame 3 vertical wall. Interior cover 2 is comprised primarily of a horizontal wall with cavity 2A located thereon. Cavity 2A aids in securing interior cover 2 to the exterior cover 1 and also provides handholds for moving hatch-cover 100.

FIG. 3 also illustrates the tilted wall 1B of the, exterior cover 1 meeting with the also tilted wall of the exterior frame in its section 3I, showing a step and continuing with another section of the tilted wall 3J.

In FIG. 4, a cross-section of the hatch is shown with the cover in its open position in the interior section, showing the features of hinge linkage assembly 48.

FIG. 5 shows the improved aspect of the emergency exit feature of the invention, especially the ability to open the hatch cover to an angle greater than 90 degrees. Vertical wall 1A of exterior cover 1 is shown entering cavity 3D of exterior frame 3. The entry of vertical wall 1A into cavity 3D permits an angle of hatch cover opening greater than 90 degrees during use as an emergency exit.

Figure 6:
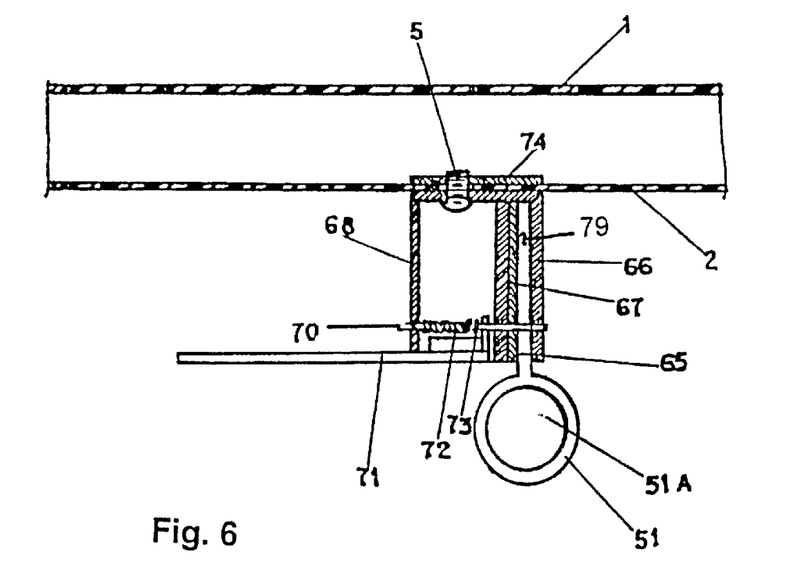
FIG. 6 is a side cross sectional view of the release mechanism in its closed position.
Figure 7:
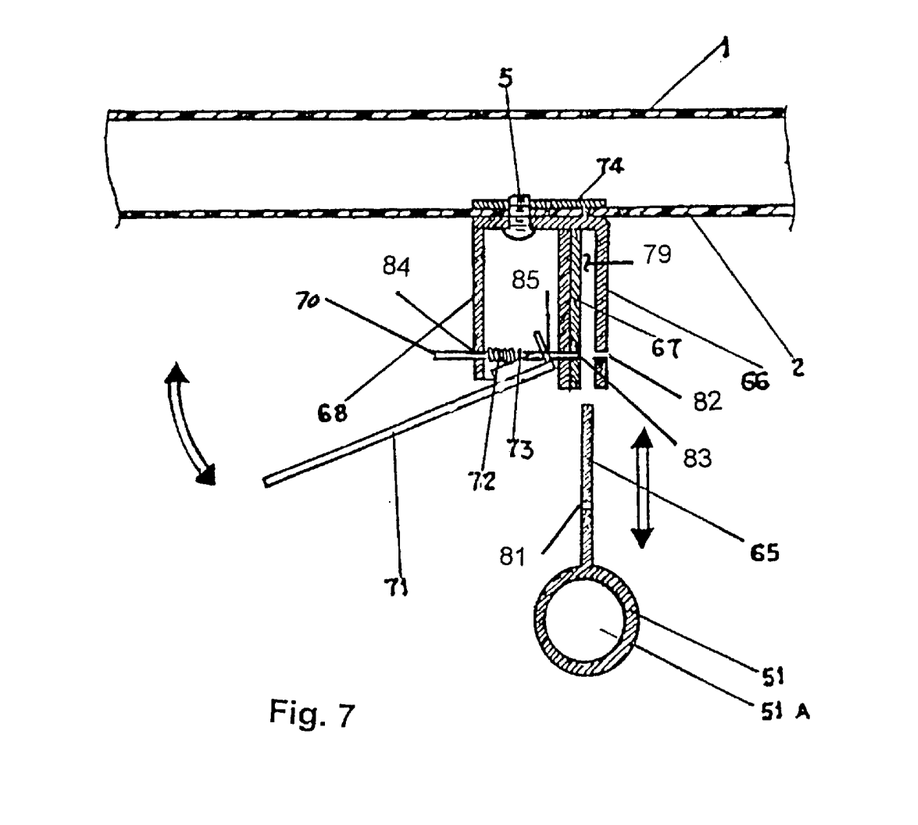
FIG. 7 is a cross sectional view of the release mechanism in its open (released) position.

FIGS. 6 and 7 show the relevant aspects of release mechanism 7°, which comprises L-shaped angular member 66, plate member 67, receiving chamber 79, which chamber is formed between L-shaped angular member 66 and plate member 67, and latch plate 65 located in receiving chamber 79. Latch plate 65 is attached to hinge tube 50 of hinge linkage 49. The release mechanism is illustrated in FIG. 6 with the hatch closed.

Fixing support 74 may be a reinforcing plate to provide greater structural support for the hatch.

FIG. 7 shows the release mechanism 7, where latch plate 65 has been released from receiving chamber 79.

Release mechanism 7 is now described in detail. In a secured position, latch plate 65 is located within receiving chamber 79. Locking pin 70 is inserted into apertures 83, 81 and 82 formed in plate member 67 (aperture 83), latch plate 65 (aperture 81) and L-shaped angular member 66 (aperture 82).

The insertion of locking pin 70 prevents the release of latch plate 65 and therefore keeps hinge linkage 49 attached to hatch cover 100. Locking pin 70 is supported by aperture 84 in plate bracket 68. Locking pin 70 is urged toward and through apertures 83, 81 and 82 by spring 72, which is located between plate member 67 and plate bracket 68. Release lever 71 has an aperture 85 through which locking pin 70 penetrates. Stop 73 is provided on locking pin 70 to provide a point of contact for release lever 71 to effect the movement of locking pin 70. With release lever 71 located between stop 73 and plate member 67, a user may retract locking pin 70 from apertures 82 and 81 by pulling upon release lever 71. The withdrawal of locking pin 70 allows for the withdrawal of latch plate 65 from receiving chamber 79 and the subsequent opening of hatch cover 100 to an emergency exit position.

FIGS. 15 and 16 are provided to illustrate one of the four cavities 4A of the interior frame 4 which are capable of being telescopically adjusted to the joining bushing 76 (not shown) which is found in the exterior frame assembly 3 (not shown). These cavities allow the hatch of the present invention to be fit to the particular vehicle.

While certain novel features of this invention have been shown and describes, these are intended to be for illustration and are not done by way of limitation. It will be understood therefore, that various omissions, substitutions and changes in the forms and details of the device illustrated and in its operation can be made by those skilled in the art without departing from the spirit and scope of the invention.

What is claimed is:

1. An assembly for mounting an outwardly opening hatch in a passenger vehicle opening, the opening surrounded by an outside marginal area and an inside marginal area, the assembly having a hatch, a sealant member, and a mounting frame assembly;

the hatch comprising an exterior cover and an interior cover, the exterior cover having a greater surface area which overlaps that of the interior cover, the overlap of the exterior cover forming a sealing edge within the periphery of the exterior cover and further delineating a downwardly extending edge;

the sealant member attached to the sealing edge of the exterior cover;

the mounting frame assembly comprising an exterior frame and an interior frame, the exterior frame having a mounting flange portion extending laterally outwardly and overlaying the outside marginal area of the vehicle opening, an exterior wall extending upwardly from the mounting flange portion, an upper edge which forms a hatch sealing edge, and an interior flange portion which lines the vehicle opening;

the interior frame having a mounting flange portion extending laterally outwardly and overlaying the inside marginal area of the vehicle opening, and an interior flange portion which lines the vehicle opening, wherein the interior flange portions of the exterior and interior frames are in an overlaying relationship;

the assembly including a fixed hinge linkage and at least one separable hinge linkage to connect the hatch to the mounting frame assembly, and to allow for movement of the hatch-relative to the mounting frame assembly;

wherein the exterior frame comprises a cavity formed at the juncture of the mounting flange portion and the exterior wall, the cavity located on the same side of the frame assembly as the fixed flange linkage, wherein, upon opening of the hatch to an extended position, the cavity is capable of receiving the downwardly extending edge of the exterior cover, whereby the hatch cover can be opened to an angle greater than 90 degrees without imposing stress upon the lid of the hatch.

2. The assembly of claim 1, further comprising:

a channel formed within the upper edge of the exterior frame and within the periphery of the exterior frame, the channel comprised of a trough with an interior wall disposed on a side of the trough toward the hatch opening, and an exterior wall disposed on a side away from the hatch opening, both walls extending above the trough, wherein the interior wall extends above the trough higher than the exterior wall, said, channel is capable of receiving the sealant member; and the sealant member comprising a flexible tube capable of compression, wherein, upon closure of the hatch, the sealant member is compressed into the channel, thereby forming a secure seal.

3. The assembly of claim 1, further comprising;

elongated mounting apertures formed in the interior flange portion of at least one of the interior frame and the exterior frame, wherein the elongated mounting apertures allow the interior frame and the exterior frame to be telescopically attached to each other and thereby adjusted to fit the thickness of the body of the passenger vehicle at the passenger vehicle opening.

4. The assembly of claim 1, wherein the assembly has a front and a rear side, wherein the assembly is mounted on a vehicle in a manner such that the front and rear sides of the assembly correspond to the front and rear of the vehicle;

wherein the fixed hinge linkage is located at the rear side of the mounting frame assembly;

wherein at the front side of the assembly, the exterior wall of the exterior frame includes a portion which extends upward from the mounting flange toward the upper edge at an angle of between 100 and 170 degrees, said angle preferably providing an aerodynamic surface to reduce wind resistance during vehicle travel; and wherein the downwardly extending edge of the exterior cover of the hatch includes a complimentary sloped surface at the front side of the assembly to continue the aerodynamic surface onto the hatch.

5. The assembly of claim 1, wherein the fixed hinge linkage comprises an L-shaped angular member fixed to the interior cover of the hatch, a hinge tube attached to the L-shaped angular member, a plurality of joining bushings projecting laterally inwardly from the mounting frame assembly and attached to the hinge tube in a pivoting relationship to allow for opening of the hatch relative to the mounting frame assembly; and the at least one separable hinge linkage comprises an L-shaped angular member fixed to the interior cover of the hatch, a hinge tube attached to the L-shaped angular member by a latch mechanism, a plurality of joining bushings projecting laterally inwardly from the frame assembly and attached to the hinge tube in a pivoting relationship, said latch mechanism adapted to disconnect the L-shaped angular member from the hinge tube to enable the hatch to open relative to the mounting frame assembly and vehicle opening.

6. The assembly of claim 5, wherein at least one of the fixed hinge linkage and separable hinge linkage further comprises:

two elongated pivot supports, each moveably connected at one end to one of the joining bushings;

two elongated pivot pins, each movably connected at one end to the opposite end of one of the elongated pivot support, the opposite end of each elongated pivot pin being located within the hinge tube, wherein each hinge tube houses the ends of two elongated pivot pins; and a compression spring within the hinge tube, providing a biasing force against the ends of the elongated pivot pins.

7. The assembly of claim 5, wherein the latch mechanism comprises:

the L-shaped angular member of a separable hinge linkage device;

a plate member attached to the interior cover near but not adjoining the L-shaped angular member, providing a receiving chamber between the plate member and the L-shaped angular member;

a latch plate attached to the hinge tube of the same hinge linkage device, capable of being received in the receiving chamber;

at least one aperture provided in each of the L-shaped angular member, plate member, and latch plate, wherein said apertures are in a linear relation when the latch plate is received by the receiving chamber;

at least one latch pin moveably located within the apertures provided in each of the L-shaped angular member, plate member, and latch plate, wherein the latch pin can be withdrawn from at least the apertures of the L-shaped angular member and latch plate, thereby releasing the latch plate and allowing the latch plate to be removed from the receiving chamber; and wherein the release of the latch plate from the receiving chamber provides for the disconnection of the separable hinge linkage device from the hatch.

8. The assembly of claim 7, further comprising:

a plate bracket attached to the interior cover near but not adjoining the plate member, providing a spring chamber between the plate member and the plate bracket;

biasing means provided to bias the latch pin away from the plate bracket, thereby urging the latch pin through the apertures in the plate member, latch plate and L-shaped angular member;

a release member capable of opposing the bias provided by the biasing means, thereby allowing the latch pin to be withdrawn from the apertures in the latch plate and L-shaped angular member.

9. The assembly of claim 1, further comprising:

a joining support attached within the vehicle opening and adjacent to the interior walls of the exterior and interior frames, the joining support providing additional structural support to the frame assembly and vehicle opening.

* * * * *